United States Patent
Mizzi

(10) Patent No.: US 6,555,931 B2
(45) Date of Patent: Apr. 29, 2003

(54) RENEWABLE ENERGY SYSTEMS USING LONG-STROKE OPEN-CHANNEL RECIPROCATING ENGINES

(75) Inventor: John V. Mizzi, Poughkeepsie, NY (US)

(73) Assignee: Omnific International, Ltd., Poughkeepsie, NY (US)

(*) Notice: Subject to any disclaimer, the term of this patent is extended or adjusted under 35 U.S.C. 154(b) by 29 days.

(21) Appl. No.: 09/952,253

(22) Filed: Sep. 14, 2001

(65) Prior Publication Data

US 2002/0033019 A1 Mar. 21, 2002

Related U.S. Application Data

(60) Provisional application No. 60/234,035, filed on Sep. 20, 2000.

(51) Int. Cl.[7] .............................. F03B 13/10; F03D 5/00
(52) U.S. Cl. ........................ 290/54; 290/43; 244/153 R
(58) Field of Search .............................. 290/43, 44, 53, 290/54, 55; 244/153 R, 33

(56) References Cited

U.S. PATENT DOCUMENTS

| | | | | |
|---|---|---|---|---|
| 3,887,817 A | * | 6/1975 | Steelman | 290/43 |
| 3,987,987 A | * | 10/1976 | Payne et al. | 244/153 R |
| 4,124,182 A | * | 11/1978 | Loeb | 244/153 R |
| 4,309,006 A | * | 1/1982 | Biscomb | 244/33 |
| 4,364,709 A | * | 12/1982 | Tornquist | 416/132 B |
| 4,572,962 A | * | 2/1986 | Shepard | 290/55 |
| 5,435,259 A | * | 7/1995 | Labrador | 114/39.31 |
| 6,072,245 A | * | 6/2000 | Ockels | 290/55 |
| 6,254,034 B1 | * | 7/2001 | Carpenter | 244/153 R |

* cited by examiner

Primary Examiner—Nicholas Ponomarenko
(74) Attorney, Agent, or Firm—Alfred M. Walker

(57) ABSTRACT

Renewable energy systems extracting energy from natural water flow or wind. The energy systems are configurations of long-stroke open-channel reciprocating engines employing one or two flow engaging elements such as drogue chutes for water flow or airfoils for wind applications tethered to a power drum and useful to generate electricity or to pump water as from wells. A wind energy system using two buoyant airfoils emblazoned with advertising messages is suitable for urban deployment generating electric power and also supporting an advertising revenue stream.

19 Claims, 8 Drawing Sheets

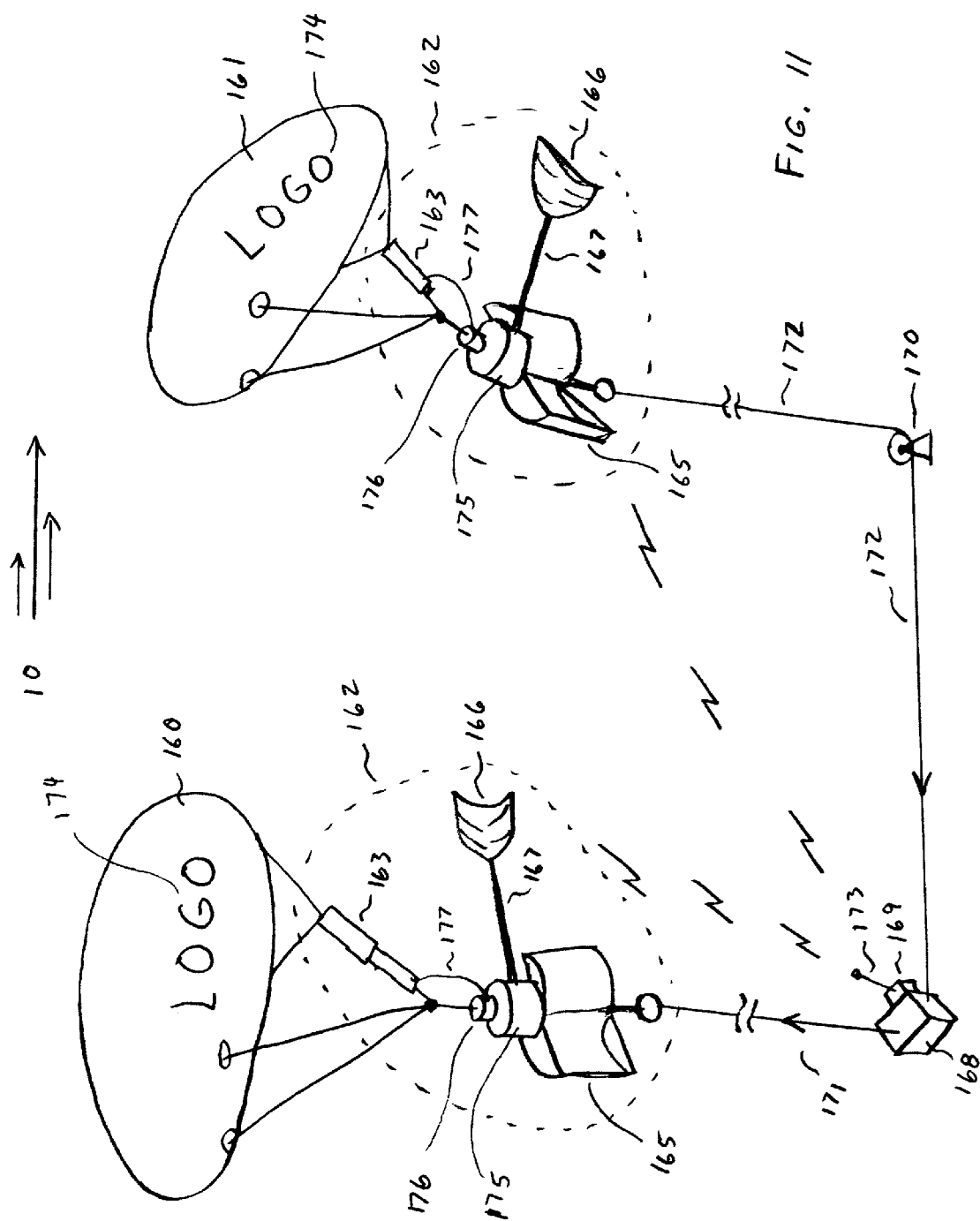

RENEWABLE ENERGY SYSTEMS USING LONG-STROKE OPEN-CHANNEL RECIPROCATING ENGINES

RELATED U.S. APPLICATION DATA

This application is based upon my Provisional application No. 60/234,035, filed on Sep. 20, 2000.

OTHER PUBLICATIONS

"Distributed Wind Power Assessment", February 2001, National Wind Coordinating Committee, Washington D.C.
"Ads Put Profit in Wind Power", *Popular Mechanics*, June, 2001, page 20

BACKGROUND OF THE INVENTION

Wind energy conversion systems, as currently deployed, are horizontal axis turbines mounted atop towers. It has been found that there is some economy of scale as well as other advantages such as lower incidence of avian mortality and less obtrusive acoustic noise output in deploying very large units of 1.5 megawatt or even larger capacities. However, out of necessity, these are usually part of large centralized "wind farms" with dedicated electrical transmission lines. Local construction of turbine blades and towers are almost required because of the difficulty of transporting the physically large sections. Often access roads to remote sites must be built for transporting the turbine and tower sections as well as for the cranes and large rigging equipment required for erection and repairs. Distributed wind power installations must use smaller turbine units which are designed to interface with existing or upgraded distribution networks at lower voltages. The rural environments compatible with distributed wind power often do not have three-phase AC distribution which is a requirement for even modest (eg.— 50 kw) units. Needless to say, high population density areas and high buildings in urban environments, while having adequate distribution networks and ready markets, are not a good match to a technology using towers (which also precludes their attachment to existing structures due to large moment loads and vibration). No known wind energy systems are compatible with the direct generation of other forms of secondary revenue streams.

In considering extraction of energy from natural water flow such as streams, tidal flow, or river currents, the sequestering of flow behind dams or barriers has traditionally been required. This incurs large outlays of capital, and often substantial environmental impact to man and to marine life. Pressure changes and sharp rotating blades within commonly used hydro turbines are themselves a danger to fish fry. The installations for hydroelectric plants or tidal generating facilities are generally permanent and unmovable fixtures.

SUMMARY AND OBJECTS OF THE INVENTION

This invention introduces the notion of a long-stroke open-channel reciprocating engine as an alternative to the turbines presently used to extract energy from the flow of water or air. Certain features of this type of reciprocating engine are analogous to other well known reciprocating engines such as steam or internal combustion engines. For example, the functions of pistons, crankshaft, valves, and connecting rods have direct counterparts while the cylinder, a flow confining element, has no counterpart in this "open-channel" engine. The engine of this invention uses drogue chutes to engage water currents or airfoils to engage wind in a manner analogous to pistons. Tethers of strong fibers such as nylon or aramid attach the drogue chutes or airfoils to a periodically reversing power drum which is turned when tether unwinds, not unlike the interaction of connection rods and crankshaft. Since this is a long-stroke engine, the power drum will turn multiple revolutions during one engine stroke. Valves have a direct counterpart in control of the drogue chutes or airfoils as they are purposely switched from a high pull mode (high drag and/or lift) to a low pull mode (low drag and/or lift) or vice-versa at the end of a stroke. As in other engines with a single piston, the most simple version has a single drogue chute or airfoil which extracts mechanical energy from fluid flow as it unwinds tether from the power drum in high pull mode and then must be wound back on the power drum while in low pull mode using parasitic energy; this is a "single-acting" engine which extracts net positive energy over a complete cycle, but only on alternate strokes. Slightly more complex, an engine of this invention using two drogue chutes or airfoils can extract net positive energy from fluid flow on each stroke (ie.— "double-acting") since one element is always in high-pull mode while the other is in low-pull mode reversing their respective roles at the end of each stroke. The extracted mechanical energy results from the difference in pull forces between the high-pull element unwinding tether from the power drum and the low-pull element being rewound onto the power drum. The parasitic loss is still there, but the power produced is almost continuous except for the brief pause at the end of each stroke during mode switching.

For water flow applications, the reciprocating engine of this invention can extract power directly from flow without sequestering it behind barriers or dams. In fact, an engine of this invention can be simply suspended below a moored barge. A system using a single drogue chute can follow rapidly shifting water currents without entanglement. Systems using a pair of drogue chutes can better extract energy from flowing water currents where rapid direction shifts are not a problem. The cyclic opening and closing of soft fabric structures such as drogue chutes at ambient pressure pose no threat to aquatic life; such movement is also conducive to self-cleaning from encrustation as from barnacles. The fact that very large drogue chutes can be deployed at very modest capital outlay compared to that of erecting and maintaining permanent civil works for alternate approaches implies lower system costs are indicated. Note that the systems of this invention for water applications are portable; they can be moved seasonally to optimize power generation or to accommodate other seasonal uses of a particular water area.

The advantages for wind energy conversion systems of this invention over traditional wind turbines are many. One important factor is that no towers are required. Heavy base equipment such as power transmissions and generating equipment is at ground level where it can be safely maintained without climbing towers. No very large elements are needed for this invention. Even large capacity systems can be transported over normal roads or even taken up elevators and erected on building roofs since no moment loading is involved and vibration is controlled as for any large mechanical device by known techniques. Using two self-buoyant helium or hydrogen inflated airfoils or a pair of non-buoyant fabric airfoils such as flexifoils attached to buoyant aerostats, the airfoils are simply suspended in the air regardless of the amount of wind. When wind picks up, the airfoils will synchronously reciprocate by virtue of mechanisms which adjust their angle of attack to control lift and/or drag to produce low pull and high pull modes as needed.

Because of the inherent safety factors and lack of towers, these systems would be more easily integrated in populated commercial or industrial areas where adequate distribution lines exist and markets for generated electric power are in the local vicinity. Thus, the wind systems of this inventions are ideal for distributed wind energy in urban environments. Because of their integration with populated areas and the opportunity available by virtue of highly visible areas on the airfoils or their aerostats, the display of commercial logos or advertising messages can constitute a second revenue stream to enhance the profitability of such wind energy systems. Besides the urban deployment, other unique factors enhance the suitability of these wind systems where wind turbines with towers cannot compete. These systems can be deployed in hurricane prone areas since the airfoils can just be reefed at ground level and secured in case of impending storms. Small systems are so compact that they can even be back-packed and instantly deployed for camping use or for powering scientific instruments in remote windy areas. Similarly, they can be used on pleasure craft or recreational vehicles. Major wind farm installations off-shore can be simply installed on moored barges, no permanent towers below water level need be erected. On a grand scale, special airfoil designs with "super-tethers" can be used to extract power from the jet stream. For wind farm applications, it may be possible to locate these systems in non-picturesque areas with good wind resource that would be prohibitive to harvest due to the high towers that would be necessary with conventional wind turbines. With these systems, airfoil height is simply a function of the length of a tether.

For water pumping applications on farms, it is possible to erect simple single airfoil systems that even use non-buoyant techniques by employing a tall light weight tower that just supports an airfoil at its lowest stroke position if the wind ceases to blow. This type of system can be built locally of indigenous materials. Buoyant techniques would eliminate the need for even this light weight tower. In either case, no power drum is necessary if reciprocating motion can be used directly for powering a reciprocating pump. Simple techniques for valving of the single airfoil can be implemented using an auxiliary tether from ground level, or these systems can use a self-regulating wind turbine powered mechanism situated aloft adjacent to the airfoil. This mechanism would cyclically adjust the airfoil in high-pull and low-pull modes as long as the wind is blowing. The difference in pull force would operate the water pump in a reciprocating fashion. These systems for water pumping save money in erection costs and first costs by eliminating the high cost of towers used by conventional water pumping windmills.

BRIEF DESCRIPTION OF THE DRAWINGS

The present invention can best be understood in connection with the accompanying drawings. It is noted that the invention is not limited to the precise embodiments shown in drawings, in which:

FIG. 11 is a High level perspective view of a complete wind energy system using two buoyant airfoils.

DETAILED DESCRIPTION OF THE INVENTION

Figure 1:
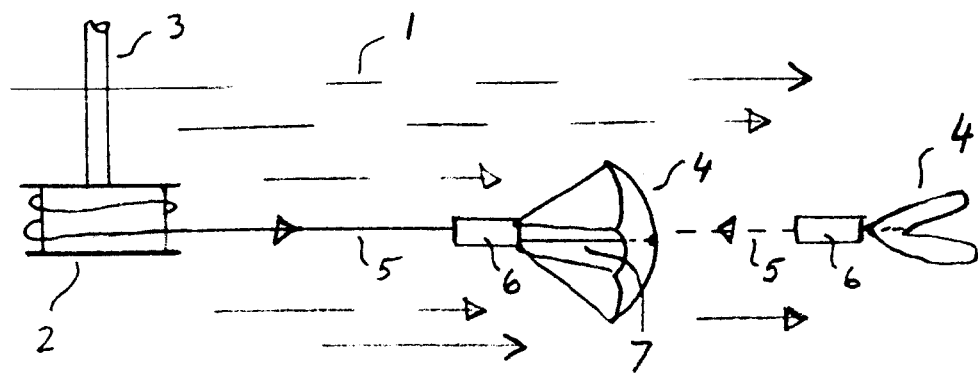
FIG. 1 is a Side elevation of water current system using a single drogue chute.

The most important cost metrics for assessing the suitability of renewable energy systems for generating electric power are $/installed kW and cents/kWh. Both factors are a function of many parameters that range from cost for real estate to hourly wages for maintenance crews. These metrics are also related to the technology used. The technology used in this invention tends to minimize capital and labor-related installation costs as described in the summary. The low environmental impact and the serendipitous linking of advertising revenue for the wind energy versions are other factors which relate to the feasibility of an installation. The operations and maintenance (O&M) side of the equation is more questionable especially for the wind versions using buoyant elements. However, materials advances point to favorable outcomes. NASA's Ultra Long Duration Balloon (ULDB) project describes a multi-layer composite balloon material known as DP6611.25/PE which can have application to the airfoils and aerostats of this invention. It is a very light weight durable low-permeability fabric with the potential for extending preventive maintenance schedules to attractive intervals. It is a five layer composite with a polyester woven fabric load bearing layer, a 0.25 mil Mylar film fabric stability/barrier layer, a 0.25 mil PE film for toughness/tear resistance/back up barrier, and two adhesive layers.

The inventor has personal experience with drogue chutes for the water versions of this invention. Experiments using a heavy fabric parachute style drogue chute which can be placed in a low-pull mode by pulling on a center "dump cord" (which causes the chute to fold down into a low crossection profile perpendicular to flow) showed promise. The ratio of high to low pull at usable river flow velocities were 4:1 or greater. The inventor also has personal experience with parasail type airfoils of nylon ripstop construction using attached weather balloons as buoyant elements. These also had acceptable high-pull to low-pull ratios although the lift was limited; however aerodynamic drag can be used effectively as an surrogate parameter. A variety of airfoil shapes are described in the drawings of this invention. An exhaustive performance comparison or airfoil design for this application has not as yet been performed; the shapes described are presumed to be sub-optimal.

FIG. 1 shows a side view of a water power concept to extract energy from water current 1 using a single drogue chute 4 which is alternately placed in a high pull mode as shown by mode adjuster 6 to pull on tether 5 unwinding from reversing power drum 2 and providing useful torque on shaft 3. The adjacent low-pull configuration shown attached to a dashed tether 5 is achieved by shortening dump cord 7. In this configuration, drogue chute 4 is rewound onto power drum 2.

Figure 2:
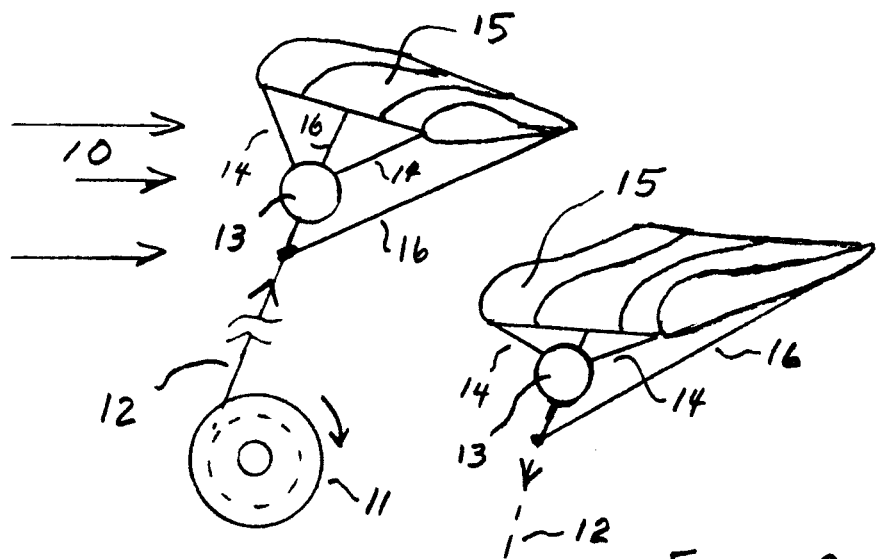
FIG. 2 is a Side elevation of a wind system using a single buoyant airfoil.

A similar wind system version is shown in FIG. 2 wherein bridle lines 14 are shortened by adjuster 13 to achieve the low-pull configuration shown at the right. On the left, wind from direction 10 is used to provide lift on high-pull configured buoyant airfoil 15 to unwind tether 12 from reversing power drum 13. Tethers 5 and 12 are wound onto and the ends attached to their respective power drums 2 and 11.

Figure 3:
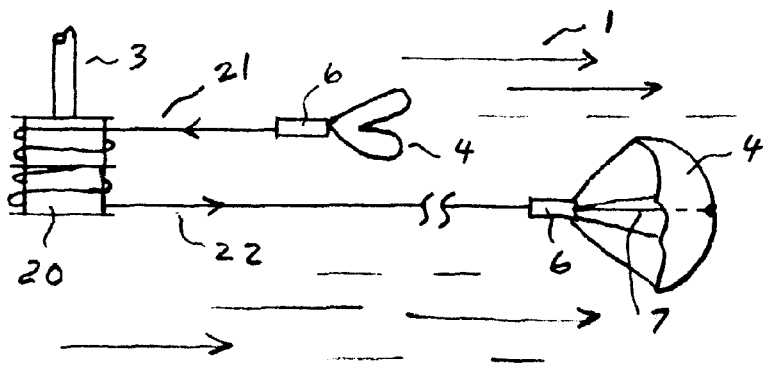
FIG. 3 is a Side elevation of a water current system using two drogue chutes.
Figure 4:
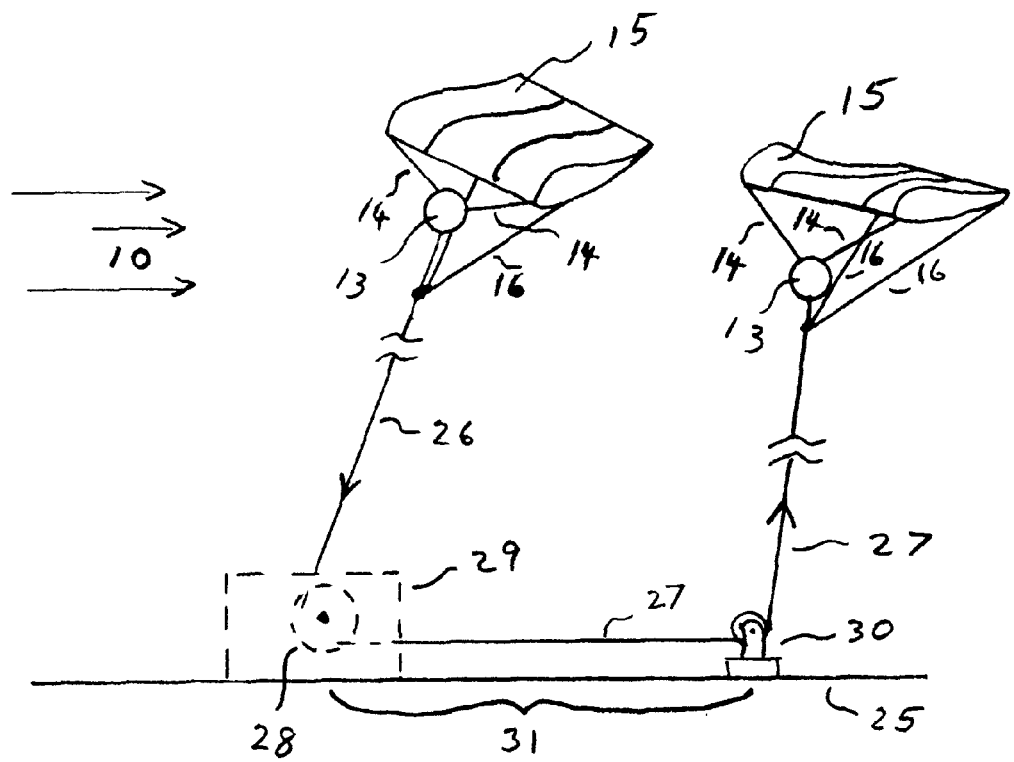
FIG. 4 is a Side elevation of a wind system using two buoyant airfoils.

FIGS. 3 and 4 show two conceptual versions for dual flow engaging elements. The water version of FIG. 3, shows a two section power drum 20 on which tethers 21 and 22 are wound in reverse directions such that when tether 22 is unwinding as shown, tether 21 pulling low-pull configured chute 4 is being pulled back by winding onto drum 20. Similar action is illustrated for a two airfoil wind system as shown in FIG. 4. Power drum 28 within base equipment housing 29 rotates either clockwise or counter-clockwise (as shown) depending on the airfoil 15 modes at the instant.

Figure 5:
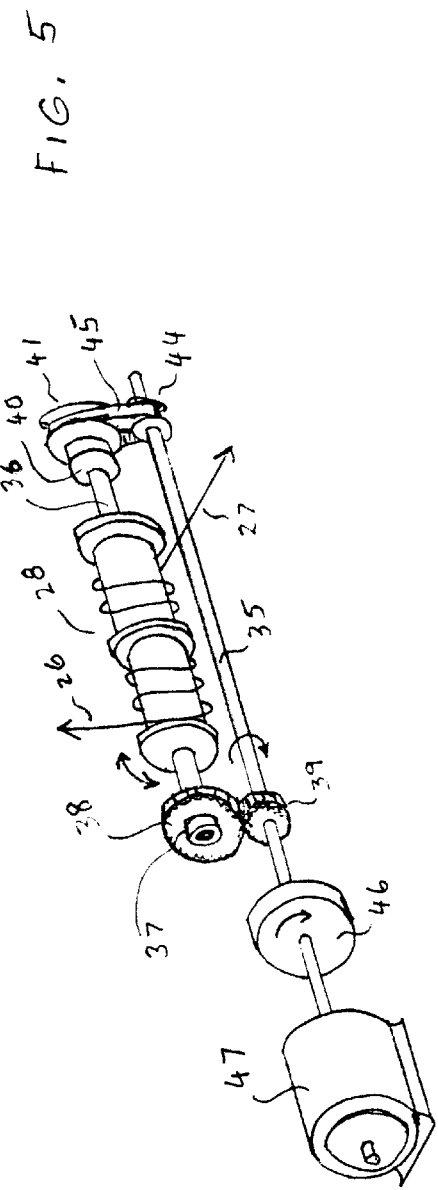
FIG. 5 is a Perspective view of mechanism for converting reversing rotation to unidirectional rotation.

FIG. 5 shows a mechanism to convert the reversing rotation of power drum 28 attached to shaft 36 to a unidirectional rotation of shaft 35. While other known mechanisms using either belts or gears to achieve this purpose are known, the operating principles are similar. Although only a mild step-up ratio of a single stage is shown from power drum 28 to generator 47, in an actual transmission, additional stages would often be used. Flywheel 46 is used to provide ride-through during mode switching at the ends of a stroke. Gear set 37 and 39 drive shaft 35 at a higher speed than drum 28 but only when drum 28 is turning counter-clockwise. This is accomplished by having one-way clutch 37 decouple gear 37 from shaft 36 whenever it is turning clockwise. Similarly, the pulley/belt drive at the distal end incorporating drive pulley 41, timing belt 45, and driven pulley 44 drive shaft 35 clockwise when shaft 36 is rotating clockwise (no reversal) at the same ratio as the gear set only when shaft 36 is rotating clockwise. This is accomplished by one-way clutch 40 which decouples pulley 41 from shaft 36 when it is turning counter-clockwise. Power drum 28 is driven by either tether 26 or tether 27 when they are respectively unwinding from drum 28.

Figure 6:
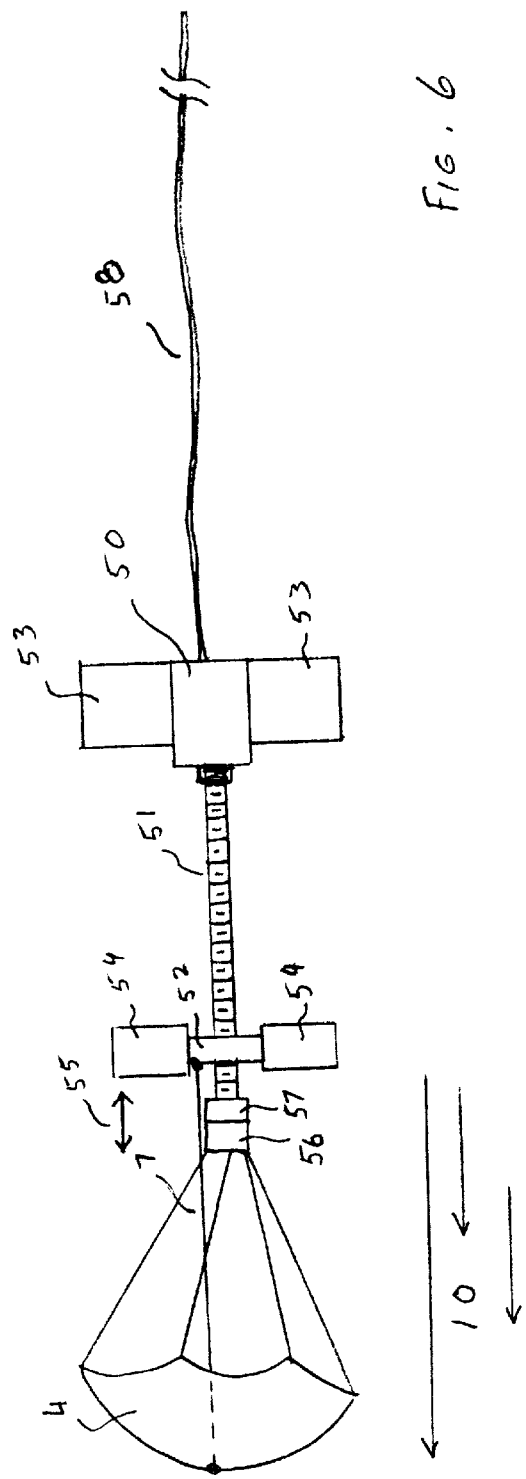
FIG. 6 is a Side elevation of electrically operated mode switching mechanism for water system use.

FIG. 6 is an embodiment of an electrically operated mode switching mechanism of this invention for water use. This is the only illustrated embodiment requiring the use of tether 58 which has conductive traces embedded carrying current to operate drive motor 50 (which is submersible). Motor 50 is an electrically reversible motor with two or more rotation resisting vanes 53 attached to the housing. It drives lead screw 51 in either direction. Nut 52 with rotation resisting vanes 54 is urged either left or right depending on the direction of rotation of motor 50. Bridle terminator 56 is coupled via free rotation coupling 57 to the end of screw 51. Dump cord 7 is attached to nut 52. In operation, brief periods of motor 50 operation in alternate directions select the opposite operating mode of attached drogue chute 4. This mechanism can be used for either single drogue chute systems or for those using two since electrical synchronization can be used to simultaneously change the modes of both drogue chutes in different directions at the end of a stroke.

Figure 7:
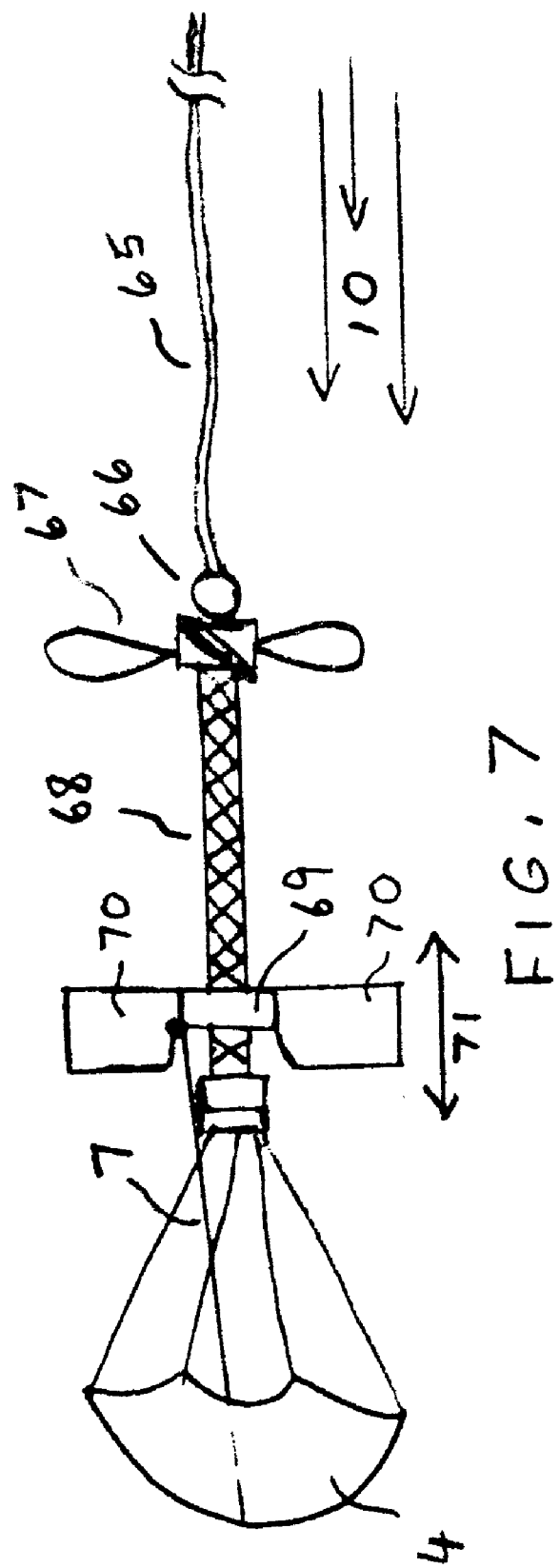
FIG. 7 is a Side elevation of flow-operated continuous mode adjustment mechanism for water system use.

FIG. 7 shows a different embodiment of a mode changing mechanism which is continuously driven by water current. This embodiment is usable for single chute systems only since there is no means of synchronization. Tether 65 which may be conductive or non-conductive is attached to reversing screw 68 via swivel coupling 66. Propeller 67 is rigidly attached to screw 68 and turns it continuously in the same direction as long as water current 10 is flowing. Nut 69 with rotation resisting vanes 70 is continuously driven back and forth since the characteristic of a reversing screw is that a nut driven by one changes direction at the end of travel without a change of rotation direction. Thus drogue chute 4 is continuously opened and closed at a constant rate for constant current 10 flow. A tension sensor on tether 65 can be used to trigger the rewind phase upon sensing a tension lower than a threshold set into the system; the latter can be dynamically set as a function of current 10 velocity.

Figure 8:
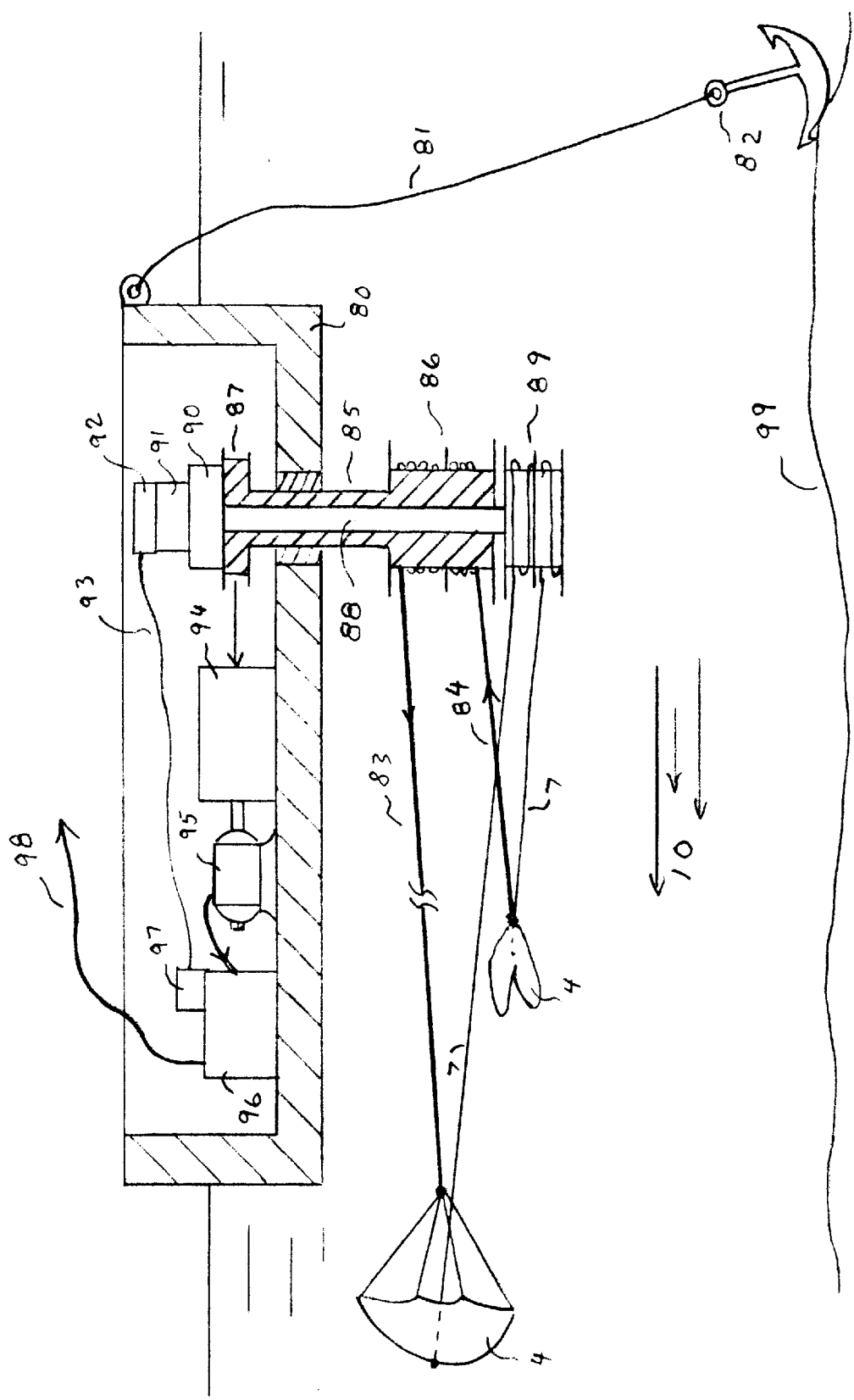
FIG. 8 is a Side elevation in partial crossection of a complete water current system.

FIG. 8 is a side view in partial crossection of a complete system for extracting energy from moving water currents. In this embodiment, the system is mounted within and below a barge 80 which is moored by virtue of tether 80 and anchor 82 on the bottom 99 of the water channel. Two drogue chutes 4 are used such that one is always placed in the mode opposite the other with modes synchronously switching at the extreme ends of a stroke. As tether 83 unwinds from reversing power drum 86, tether 84 wound in the opposite direction is wound back on. Outer shaft 85 drives pully 87 which is the power take-off point feeding power to transmission 94 which creates a high RPM unidirectional drive to generator 95 which feeds power conditioner 96. The output from power conditioner 96 is utility grade power wheeled to shore via cable 98. Control box 97 feeds controlled pulses of current via slip rings 92 to braked motor 91 which drives planetary gearbox 90 driving inner concentric shaft 88 driving mode control drum 89. Since gearbox 90 with motor 91 atop is attached to pulley 87, it rotates with power drum 86. Shaft 88 can change the length of each dump cord 7 relative to tether 83 or 84. This is done synchronously every time motor 91 is energized for a short burst at the end of a stroke, then the chute 4 that was closed (low-pull) will open simultaneously with the formerly open chute 4 being closed by shortening cord 7 relative to tether 83. Motor 91 has a brake which resists rotation when motor 91 is not energized. In this manner, the lengths of dump cords 7 are dynamically moved with tethers 83 and 84 via drum 89 while maintaining their length differentials relative to tethers 83 and 84.

Figure 9:
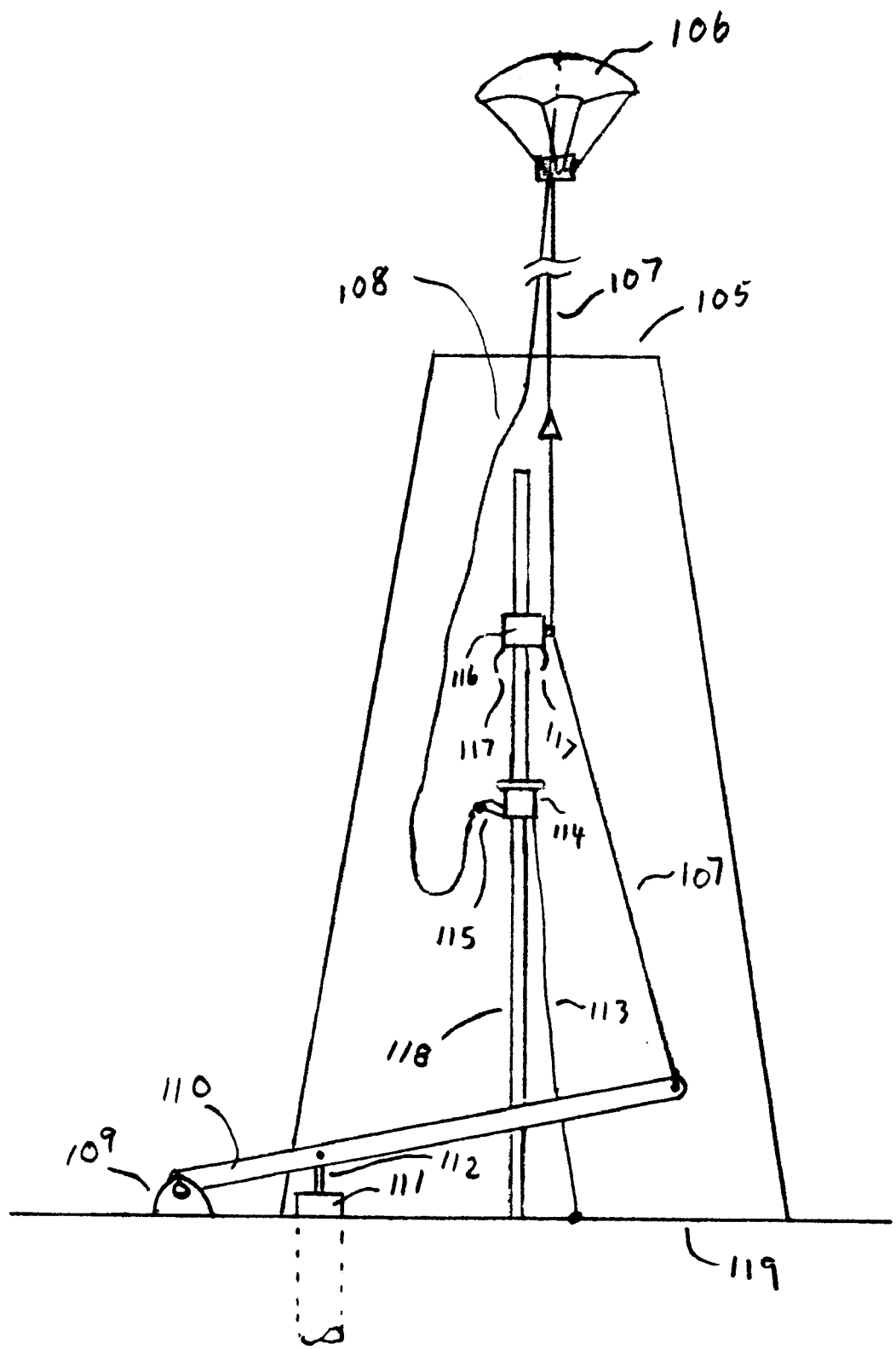
FIG. 9 is a Side elevation of water-pumping wind system using a light tower structure.

FIG. 9 illustrates an embodiment for a water pumping system built with low-tech indigenous materials. It uses a single parasail type airfoil and no buoyant elements. This is the only embodiment of this invention that uses a tower. Tower 105 is a light weight structure that operationally just has to survive direct wind load and to support airfoil 106 in periods of no wind. Practically, it should also safely support the weight of a service person climbing it during initial installation or for maintenance or repair. Reciprocating pump cylinder 111 and piston rod 112 constitute the well pump which is operated by long rod 110 (a long bamboo pole would suffice). Pivot 109 locates and controls the motion of rod 110. Parasail 106 pulls power tether 107 up when parasail 106 is in its high lift/drag configuration as shown and wind is blowing. The rest of the system relates to a low-tech mechanism for mode switching; a working model has been built. It consists of rod or tube 118 which can be a wooden dowel or a piece of PVC pipe; its purpose is to guide two hollow elements which ride along it. Top element 116 has springy grippers 117 which will grab onto the upper lip of dump cord 108 weight 114. This hollow weight element 114 has a latch 115 which prevents it from falling due to gravity but can be easily overwhelmed by a medium pull as by top element 116 being lifted by tether 107 while being mated with weight 114. Dump cord 108 is of such length that it is slack at the top resting point of 114 as determined by the length of cord 113 which limits travel. In operation, assume that at the start of a cycle, both 114 and 116 are mated and at ground level. If wind is blowing, it will force airfoil 106 open and start lifting rod 110, 114 and 116. When 113 becomes taut, 114 stays at that level while 116 snaps off and continues up until cord 108 becomes taut releasing latch 115 at which point weight 114 falls, thereby closing airfoil 106. Airfoil 106, distal end of rod 110, 114, and 116 all go down and 116 mates with 114 at ground level. The cycle has returned to its starting position. This reciprocating action continues as long as sufficiently strong wind blows; it operates water pump 111 by this action.

Figure 10:
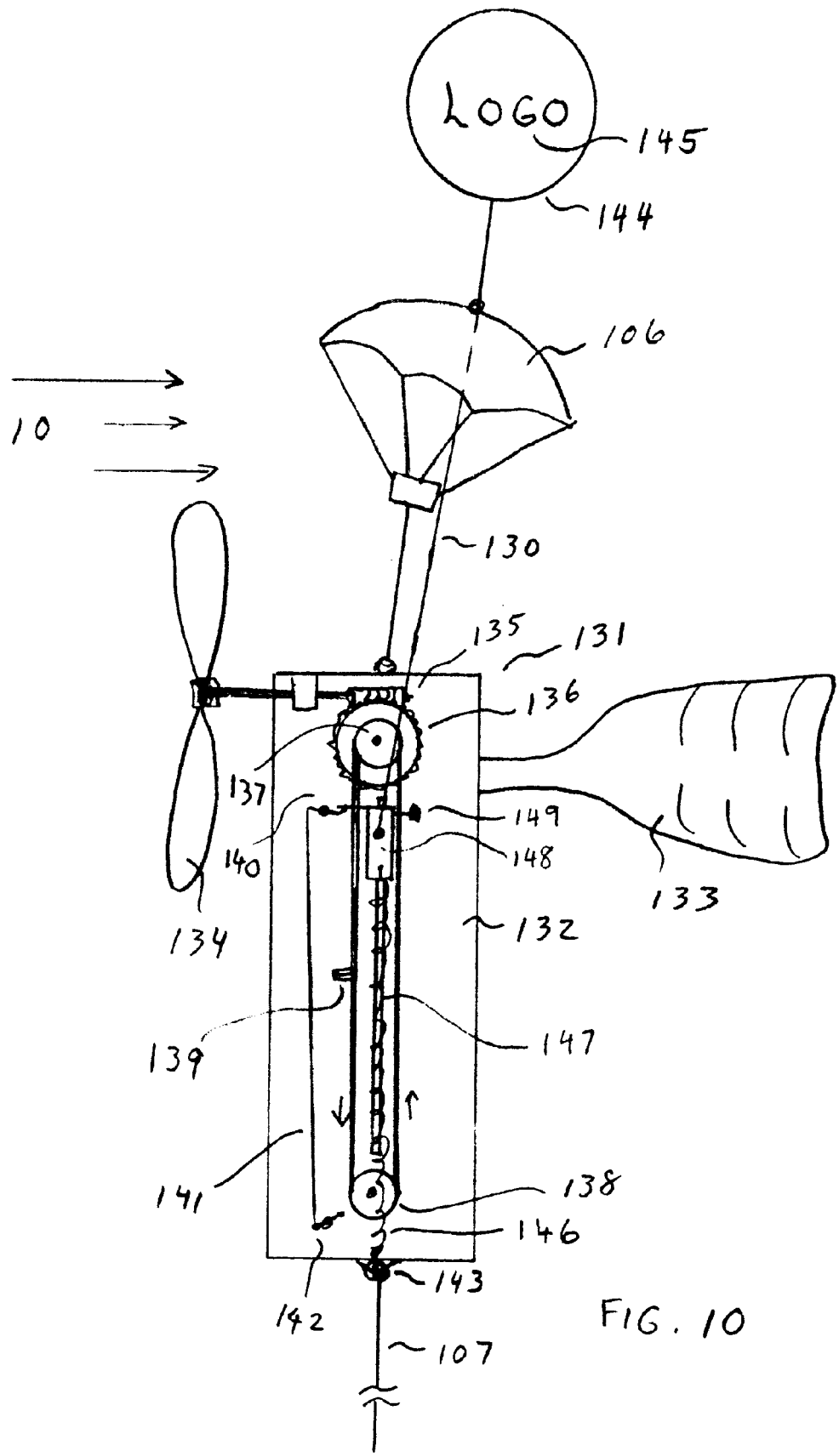
FIG. 10 is a Side elevation of wind-operated mode switching mechanism.

FIG. 10 is a detail of another embodiment of a mode control mechanism for single airfoil systems. A model to demonstrate the operation of this mechanism has been built. It is shown in a system with a single non-buoyant airfoil 106 attached to a buoyant aerostat or balloon 144 which has enough buoyant lift to support airfoil 106 as well as mechanism 131 (which is enlarged relative to 106 to show more detail). Frame 132 is attached to power tether 107 by swivel joint 143. Small wind turbine 134 turns worm gear 135 which is mated with spur gear 136 driving top timing belt pulley 137. The timing belt which rides between driving pulley 137 and idler pulley 138 has a single nib 139 which goes up and down continuously at a slow rate determined by wind 10 velocity and the gear ratio between worm gear 135 and gear 136. Carrier 148 rides on rail 147 and is biased downward by spring 146. As shown, it is latched at the top position by latch 140. When nib 139 reaches latch trip 142, trip cable 141 will release carrier 148 which is quickly pulled down by spring 146. Since dump cord 130 is attached to carrier 148, airfoil 106 is closed. It stays closed until nib 139 works it way up engaging arm 149 lifting it toward the latched position and gradually opens airfoil 106. Thus the cycle is repeated. The percentage of on versus off time can be regulated by moving the location of trip point 142 anywhere along the path of nib 139. Tether 107 can be attached to a rod which drives a reciprocating pump as in FIG. 9. Alternatively, tether 107 can be wound around a power drum during low-pull periods and unwound during high-pull periods. Note that an advertising logo 145 or message can be emblazoned on aerostat 144.

FIG. 11 shows a two airfoil system using buoyant airfoils. This embodiment is ideal for larger systems but may also be used on small capacity systems. A subsystem 162 adjacent to each airfoil, 160 shown in high lift configuration or 161 shown in a low lift configuration, is used to perform synchronized precision mode switching. As shown, airfoil 160 is lifting tether 171 which is unwinding from a reversing power drum within base equipment housing 168. At the same time, tether 172 is being rewound on the same power drum thereby pulling down airfoil 161 through remote pulley 170. The ground separation is used to minimize the chance of tangling of one airfoil around the other in case of exposure to brief cyclonic wind conditions. Airfoils 160 and 161 are modeled on SkyDoc balloons available from Big Ideas Corp. of Syracuse, N.Y. While probably not optimal, these omnidirectional designs have a fair amount of lift and can be easily placed in a stall position by manipulating the length of part of the bridle. They also have large unencumbered surfaces which are ideal for display of logo's 174 or other advertising material. The subsystems consist of a bottom swivel coupling to tethers 171 or 172, a small Savonius rotor 165, housing 175 containing several items, top swivel connector with slip rings 176, tail shaft and receiver antenna 167, anti-rotation tail 166, short electric cable 177 and extendable electric actuator 163. The items in housing 175 are a small dc generator for charging a storage device such as a large value capacitor and/or storage battery, a radio receiver for receiving mode switch signals, and driver circuitry for operating actuator 163. Note that the Savonius rotor 165 adaptively generates more or less electric power as a function of wind velocity; mode switching power demand (number of switches per unit time) is also a function of wind velocity. Signals for precise mode change at the extreme ends of a stroke are perfectly synchronized by radio signals from transmitter 169 with antenna 173 attached to the side of housing 168. Note that for safety reasons (lightning protection) tethers 171 and 172 are not electrically conductive. Subsystem 162 are small and light weight; power is locally self-generated eliminating the need for long conductive elements. The electronics for subsystems 162 have been proven in hundreds of applications such as industrial controls and radio-controlled model airplanes and cars.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended claims.

I claim:

1. A renewable energy generating system comprising:
    a long-stroke open-channel reciprocating engine having at least one tethered flow engaging element, said flow engaging element being one of at least one drogue chute in water or at least one floatable airfoil in air, which is cyclically switchable from a low force mode to a high force mode and vice-versa to extract energy from fluid flow engaging said at least one tethered flow engaging element;
    wherein said energy is extracted by unwinding said at least one tether from a cyclically reversed power drum thereby converting said extracted fluid flow energy into mechanical energy;
    wherein said at least one flow engaging element has a control element controlling cyclic switching from said low force to said high force mode and vice-versa upon command;
    wherein mechanical energy of said cyclically reversed power drum is converted to unidirectional rotation to drive an electric generator providing one of AC or DC electrical power from said extracted energy.

2. The system of claim 1 wherein said fluid flow is a natural water current including one of tidal, stream, and river flows.

3. The system of claim 1 wherein said at least one drogue chute is a single said drogue chute which is alternately open to produce an outgoing power stroke and then closed to produce a parasitic return stroke thereby extracting a net positive energy amount from said natural water current over a complete power cycle.

4. The system of claim 1 wherein said at least one drogue chute is a pair of two said drogue chutes, which said pair of drogue chutes is controlled and synchronized so that one of said drogue chutes is open and outgoing while the other said drogue chute is closed and incoming during one part of the cycle, wherein respective roles of said respective drogue chutes are reversed at the extreme ends of each operating stroke of said reciprocating engine, thereby extracting a net positive amount of energy from said natural water current on each stroke.

5. The system of claim 1 wherein said fluid flow comprises wind movement of air and said reciprocating engine is a wind energy conversion system.

6. The system of claim 5 wherein said at least one tethered flow engaging element is at least one airfoil having controllable lift/drag characteristics, which said lift/drag characteristics are thereby switchable from said low force mode to said high force mode and vice-versa.

7. The system of claim 6 whereby said at least one airfoil is self-buoyant by virtue of having at least one integral enclosed volume of a lighter than air gas including one of helium and hydrogen gases.

8. The system of claim 6 wherein said at least one is airfoil is not buoyant in itself but is attached to at least one buoyant element including one of a helium filled aerostat and a hydrogen filled aerostat.

9. A renewable energy system comprising:

A long-stroke open-channel reciprocating engine having a single tethered airfoil with controllable lift/drag characteristics, which said lift/drag characteristics are thereby switchable from a low force mode to a high force mode and vice-versa upon command to extract energy from wind movement of air to mechanically drive a reciprocating movement element.

10. The system of claim 9 wherein said reciprocating movement element pumps water.

11. The system of claim 9 wherein said cyclical mode switching of said single airfoil is controlled by at least one auxiliary tether connecting said single airfoil to the ground.

12. The system of claim 9 wherein said cyclical mode switching of said single airfoil is self-controlled and powered by a small wind turbine and mechanism aloft in the vicinity of said single airfoil.

13. The system of claim 6 wherein said at least one airfoil comprises two of said airfoils and further wherein said energy is extracted from said wind by unwinding said at least one tether from a cyclically reversed power drum.

14. The system of claim 13 wherein mechanical energy of said cyclically reversed power drum is converted to unidirectional rotation to drive an electric generator providing one of AC and DC electrical power from said extracted energy.

15. The system of claim 14 wherein said power drum is attached to each of two said airfoils using said tethers, said tethers being electrically non-conductive tethers, and further wherein said power drum, said non-reversing conversion mechanism, and said electric generator comprise base equipment at ground level.

16. The system of claim 15 wherein dynamic control of said mode of each of said two airfoils in cyclic synchronized reverse-mode relationships is accomplished by two subsystems wherein each subsystem is aloft adjacent to its respective said airfoil.

17. The system of claim 16 wherein each said subsystem includes a small wind turbine powering a small electric generator, an electric storage element, a radio receiver, and an electrically operated mode switching actuator, said radio receiver receiving synchronizing signals from a radio transmitter at ground level to reverse said mode at respective extreme ends of each said stroke.

18. The system of claim 7 wherein said self-buoyant at least one airfoil has a substantial exterior surface area devoted to displaying a perceptible indicia display of one of a commercial logo and in advertising message; said perceptible display readable from ground level by a potential purchaser to induce the purchaser to purchase at least one of products and services associated with said perceptible indicia display of an advertiser and to derive advertising income therefrom.

19. The system of claim 8 wherein said buoyant element has a substantial exterior surface area devoted to displaying a perceptible indicia display of one of a commercial logo and an advertising message; said perceptible display readable from ground level by a potential purchaser to induce the purchaser to purchase at least one of products and services associated with said perceptible indicia display of an advertiser and to derive advertising income therefrom.

* * * * *